2 Sheets—Sheet 1.

G. REID & C. STEVENSON.

AUTOMATIC CONTROLLING MECHANISM FOR CIRCULAR KNITTING MACHINES.

No. 11,378. Reissued Nov. 7, 1893.

WITNESSES

James H. Bell

E. Reese

INVENTORS

Graham Reid and Charles Stevenson

By Collingwood & Haley

Attorneys

2 Sheets—Sheet 2.

G. REID & C. STEVENSON.

AUTOMATIC CONTROLLING MECHANISM FOR CIRCULAR KNITTING MACHINES.

No. 11,378. Reissued Nov. 7, 1893.

WITNESSES
James H. Bell
J. E. Reece

INVENTORS
Graham Reid and
Charles Stevenson,
By Hollingsworth & Maley
Attorneys

UNITED STATES PATENT OFFICE.

GRAHAM REID AND CHARLES STEVENSON, OF PHILADELPHIA, PENNSYLVANIA.

AUTOMATIC CONTROLLING MECHANISM FOR CIRCULAR-KNITTING MACHINES.

SPECIFICATION forming part of Reissued Letters Patent No. 11,378, dated November 7, 1893.

Original No. 500,351, dated June 27, 1893. Application for reissue filed July 31, 1893. Serial No. 482,015.

*To all whom it may concern:*

Be it known that we, GRAHAM REID and CHARLES STEVENSON, both citizens of the United States, residing at Philadelphia, in the State of Pennsylvania, have invented certain new and useful Improvements in Automatic Controlling Mechanism for Circular-Knitting Machines, whereof the following is a specification, reference being had to the accompanying drawings.

Our invention is particularly adapted for use in connection with circular knitting machines which have automatic needle lifting and needle depressing devices of the character set forth in Letters Patent of the United States No. 471,220, dated March 22, 1892. Certain features, however, may be applied to other machines where a stop-motion device, operating also as a course-counter, is desirable.

Figure 1:
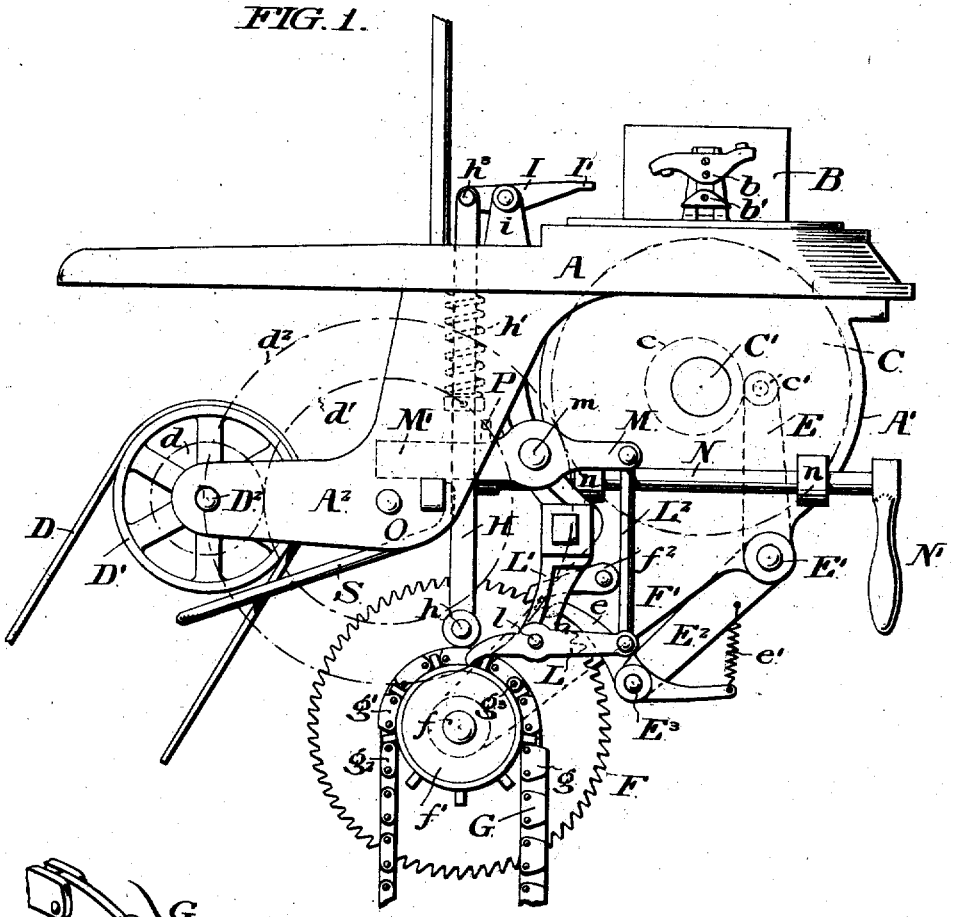
Figure 3:
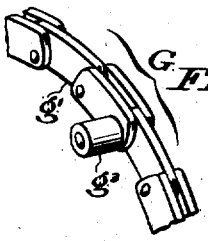
Figure 2:
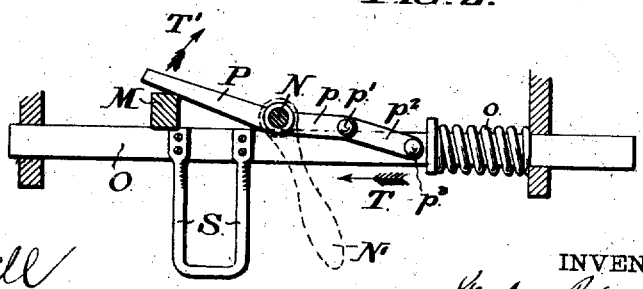
Figure 4:
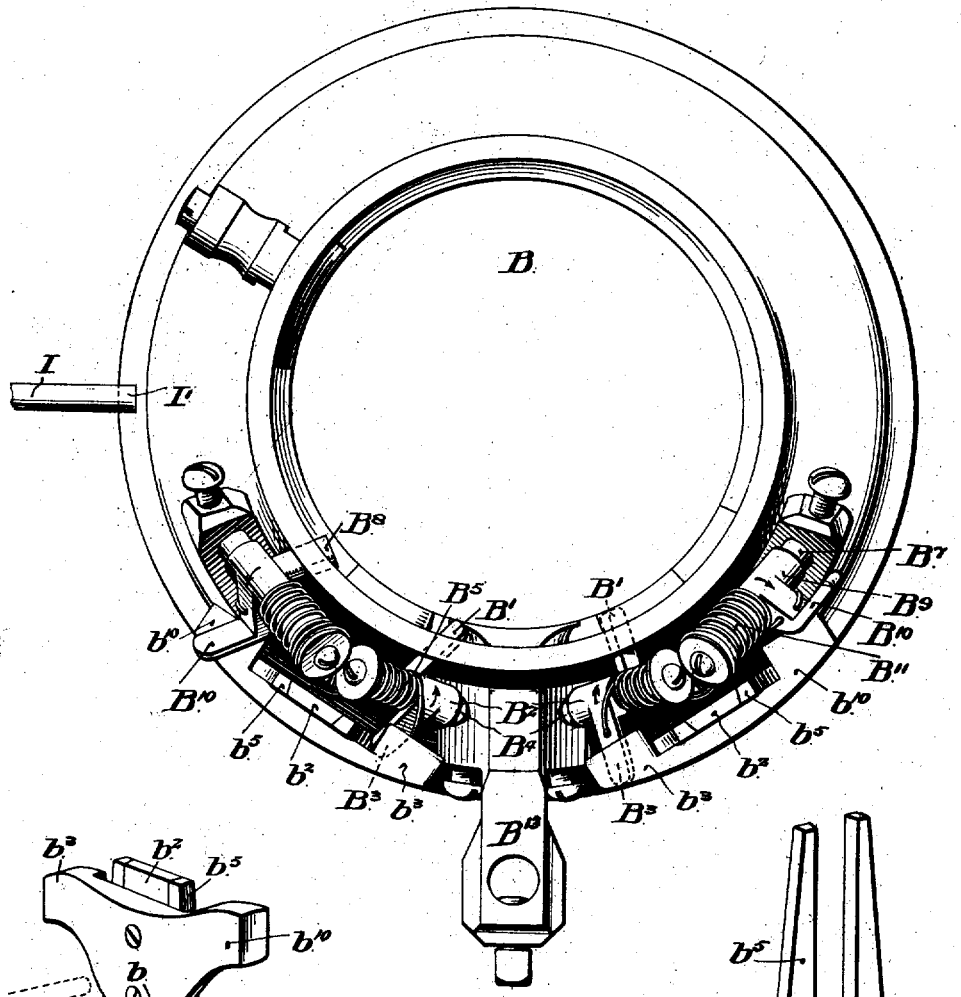
Figure 5:
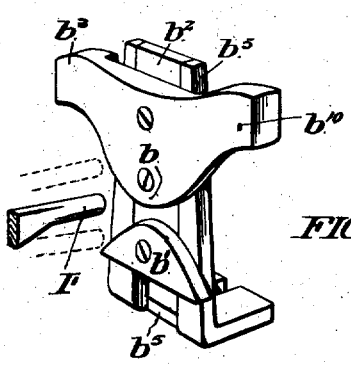
Figure 6:
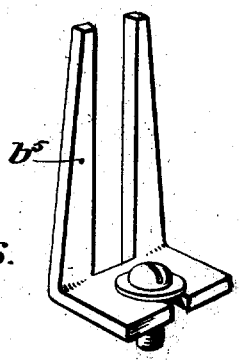

In the drawings Figure 1 represents a view in side elevation of a machine embodying our invention. Fig. 2 is a partial rear view of the belt shifting rod and its direct controlling mechanism. Fig. 3 is a view, in perspective, of a portion of the pattern chain employed in connection with the controlling devices. Fig. 4 is a top or plan view of the needle cylinder, and the needle lifting and depressing devices, showing our controlling mechanism applied thereto. Figs. 5 and 6 are detail views of the vertically movable slide which directly acts upon said needle lifting and depressing devices to throw them into and out of operation.

Referring to Fig. 1, A represents the table or base-plate on which is supported, in the usual manner, the cam cylinder B.

The details of the knitting mechanism proper are not shown, as they are well known and we have only deemed it necessary to indicate in a general manner, in Fig. 4, the arrangement of the needle-lifting and needle-depressing devices, since the details of the latter can be readily understood by reference to said Letters Patent. Broadly speaking, said devices consist of rotatable arms mounted upon inclined posts and extending through slots in the wall of the cam cylinder, in such relation to the needle hubs as to be capable of engagement above or below the same when desired. They are of course arranged in pairs, the members of each pair being symmetrically disposed on opposite sides of the thread guide, and for purposes of brief description, we will only refer to one needle-lifter and one needle-depressor and their controlling devices, since the arrangement of the others corresponds precisely therewith.

B′ represents the inwardly extending arm of the needle-lifter, carried by a collar, $B^3$, which is rotatably mounted upon the inclined post, $B^4$, said collar being also provided with an outwardly projecting finger-piece, $B^3$, the purpose of which is to effect the turning of the arm, B′, outward into such a position as to withdraw it from the range of the needle hubs, when the lifter is to remain inoperative. A spring, $B^5$, coiled about the post, $B^4$, tends normally to throw the arm, B′, inward or into an operative position. The inwardly extending arm of the needle-depressor is indicated at $B^8$, and is in like manner carried by a collar, $B^9$, rotatably mounted upon the post, $B^7$, which is inclined in the opposite direction to the post, $B^4$. Said collar also carries a finger-piece, $B^{10}$, whereby the arm, $B^8$, may be turned outward clear of the needle hubs, a spring, $B^{11}$, mounted upon the post, tending normally to throw the arm, $B^8$, into its operative position.

Our invention is addressed to the automatic manipulation of the finger-pieces, $B^3$ and $B^{10}$, and, through such manipulation, to the control of the needle depressing and needle lifting arms, (which may be conveniently comprehended under the term "needle picking devices") so as to permit either thereof to assume an operative position or withdraw both from operation. To this end we mount upon the exterior of the cam cylinder, vertically movable slides, $b^2$, on each side of the thread carrier, $B^{13}$, and in operative relation to the group of needle picking devices upon that side. Each of said slides, $b^2$, is mounted in a guide-piece, $b^5$, carried by the cam cylinder, and each slide is provided with laterally extending arms, $b^3$, $b^{10}$, the arm, $b^3$, engaging from above with the finger-piece, $B^3$, of a needle lifter, while the arm, $b^{10}$, engages below the finger-piece, $B^{10}$, of a needle-depressor. The relation between the arms on the respective slides and the finger-pieces, which said arms respectively control, is as follows: When the slide is in its middle position (*i. e.* equi-distant from the upper and lower extremes of its range of vertical movement) both the finger-pieces, $B^3$ and $B^{10}$, are held by the arms, $b^3$ and $b^{10}$, in a position corresponding with the inoperative position of both the needle-lifter, B′, and the needle-depressor, $B^8$, each being retracted into its slot, to a distance sufficient to clear the needle hubs, though not to the full extent to which it is capable of being withdrawn or turned outward. When the slide, $b^2$, is in its lowest position it depresses the finger-piece, $B^3$, still further, thus turning the needle-lifter, B′, farther outward; but the descent of the slide disengages the arm, $b^{10}$, from the finger-piece, $B^{10}$, of the needle-depressor, whose spring, $B^{11}$, thereupon throws it into an operative position. So long as this condition continues (the movements being of course similar on each group) the needle depressors are free to operate, but when the slide is again returned to its middle position, the finger-piece, $B^{10}$, is engaged by the arm, $b^{10}$, of the slide and is turned so as to throw the needle-depressor, (the needle-lifter still remaining inoperative,) out of operation. Conversely when the slide is raised to its extreme upward position, the arm, $b^{10}$, turns the finger-piece, $B^{10}$, still farther in the direction proper for retracting the needle-depressor, $B^8$, but arises away from and disengages the finger-piece, $B^8$, of the needle-lifter, B′, whose spring, $B^5$, thereupon throws it into operative relation to the hubs, the corresponding series of movements occurring of course simultaneously in the other group. It will thus be seen that the three definite positions of the slide, $b^2$, viz: the extreme upward position, the middle position and the extreme downward position, correspond respectively with, first, operative position of the needle-lifter and inoperative position of the needle depressor; second, inoperative position of both the needle lifter and needle-depressor, and, third, operative position of the needle depressor and inoperative position of the needle-lifter. The vertical shifting of the slide, $b^2$, is effected by the action of a tripping lever, I, upon one or the other of two oppositely inclined cam-pieces, *b*, *b*′, mounted upon the slide, $b^2$, and facing one another with a small interspace. Said lever, I, is capable of movement in a vertical plane upon the fulcrum, *i*, and can be shifted and set by mechanism hereinafter to be described, so as to rigidly present its free end, I′, at three different heights within the range of the cam pieces, *b*, *b*′, as they revolve with the cylinder, B. The interspace between the two most prominent portions of the cam surfaces of said pieces, *b* and *b*′, is just sufficient to permit the free passage of the end, I′, of the lever, I, when the vertical adjustment of said lever brings the end opposite to said interspace, or when the lever has completely shifted the slide, $b^2$, by engagement with either cam piece. The middle position of the lever, and such a position of the slide, $b^2$, as then brings the interspace opposite to the end of the lever, corresponds to the middle position of the slide, $b^2$, in which, as above stated, both the needle-depressors and the needle-lifters are inoperative; but when the lever end, I′, is set in its upper or lower position, the surface of one or the other of the cam pieces will operatively engage therewith, so that, in rotating past the end of the lever, the slide will be shifted vertically upward or downward into a position appropriate for setting free either the needle-lifting or needle-depressing devices as may be desired, the correlative devices still remaining locked out of action. When the slide is thus once shifted, the opening between the cam pieces, *b* and *b*′, will of course remain at such a height as to clear the end, I′, of the tripping lever, I, so long as the latter continues in the position which has effected the shifting action.

The tripping lever, I, is shifted to, and maintained in, its several positions, by mechanism operated from the main driving mechanism of the cam cylinder, and we will now proceed to describe the same in detail.

One driving belt is represented at D, and its driving pulley at D′, said pulley being journaled at $D^2$ upon the rearward projecting end of the arm, $A^2$, dependent from the table, A.

By means of the intermediate gears, *d*, *d*′ and $d^2$, the bevel gear, C, is rotated to actuate the cam cylinder for reciprocating movement merely, other mechanism (not shown) being used for the continuous rotation thereof. As, however, all of these operations are well understood, it is not necessary to describe the means whereby the actuation of the cam cylinder is changed, from continuous rotation to reciprocating or oscillating movement. The bevel gear, C, is secured to the shaft, C′, which has its bearings in the guard plate, A′, depending from the table, A, and said shaft carries an eccentric, *c*, whose periphery bears against a roller, *c*′, upon the arm, E, of a bent lever pivoted at E′, the other arm, $E^2$, of said lever carrying a pawl, *e*, pivoted at $E^3$, and provided with a spring, *e*′, to maintain it in operative contact with its ratchet wheel, F. The shaft, *f*, of this ratchet wheel is provided with a bearing in the downwardly and rearwardly projecting arm, F′, which depends from the guard plate, A′. At each rotation or reciprocation of the shaft, C′, the eccentric, *c*, throws the arm, E, outward and by means of the pawl, *e*, shifts the ratchet wheel, F, a distance of one tooth, the roller, *c*′, being maintained in operative contact with the cam, *c*. Said shaft, *f*, carries a sprocket wheel, *f*′, whose teeth engage with a pattern chain, G, having high links, *g*, medium links, *g*′, and low links, $g^3$, and also having laterally projecting roller studs, $g^4$, shown more clearly in Fig. 3. The ratchet wheel, F, is also provided with a guard pawl or keeper, $f^2$, mounted upon the arm, F′.

A longitudinally movable vertical rod, H, is mounted in position to engage operatively with the links of the pattern chain, the lower end of said rod being provided with a roller, $h$, which rests upon the outer surface of the links, being maintained in contact therewith by means of a spring, $h'$, bearing against the under side of the table, A, and normally thrusting the rod downward. The upper end of the said rod is pivoted at $h^3$, to one end of the lever, I, whose action upon the cam pieces, $b$, $b'$, and slide, $b^3$, has been already set forth. Obviously, the vertical movement of the rod, H, due to the passage from one set of links to another upon the pattern chain, will shift the lever, I, so that its inner end, I', can be brought to any one of the three positions indicated, and the lever can of course be maintained in any given position during a predetermined period.

We prefer to use a lever as the intervening device between the rod, H, and the direct controlling mechanism for the needle-picking devices, but we do not limit ourselves specifically to the use of a lever as the element whose vertical position relative to said mechanism determines the operation of the latter, it being obviously only necessary that some vertically movable member engaging with the rod, H, should extend within the range of rotation of said controlling mechanism and be capable of passing by or tripping the latter in its different positions. The pattern chain also controls the belt shifting devices of the machine by the following arrangement.

The laterally projecting studs, $g^3$, of the pattern chain engage with one end of the lever, L, pivoted at $l$, upon the arm, L', which depends from the table, A, the other end of said lever being attached to a rod, $L^2$, which in turn is connected with the lever, M, pivoted at $m$ upon said arm, L'. The free end of the lever, M, is prolonged and weighted, as indicated at M', so as to normally tend to depress the end of the lever, L, into a position ready for operative engagement with the rollers, $g^3$; and when in this position the inner end, M', of the lever, M, rests upon the upper surface of the horizontally mounted belt shifting rod, O. (See Fig. 2.) Said belt shifting rod, O, is provided with the usual shifter-fingers, S, which embrace the belt, D, and is capable of longitudinal movement, being provided with a spring, $o$, which tends normally to throw the belt off the fast pulley, D'.

Direct control of the belt shifting rod, O, is obtained by means of the following devices. A rock shaft, N, provided at its outer end with a handle, N', is mounted in bearings, $n$, upon the guard plate, A'. A rock arm, $p$, is rigidly secured on said rock shaft, N, and is pivoted at $p'$, to a link, $p^2$, pivotally secured at $p^3$, to the belt shifting rod, O. A second arm, P, is also rigidly attached to the rock shaft, N, and projects therefrom a sufficient distance to rest upon the lever, M.

In Figs. 1 and 2 the belt shifting rod, O, is represented in a position corresponding with the running of the driving belt upon the fast pulley, and it will be seen that said rod is locked in this position, since any movement thereof in the direction of the arrow, T, is prevented by contact between the rock arm, P and the upper surface of the lever, M, the pivotal point of connection between the arm, $p$, and the link, $p^2$, being above a line drawn from the axis of the rock shaft, N, to the axis of the pivot, $p^3$. When, however, the lever, M, is actuated so as to raise its free end, its movement will throw the rock arm, P, upward in the direction of the arrow, T', and by thus rocking the shaft, N, will depress the arm, $p$, and link, $p^2$, carrying them past the center at $p'$, thus unlocking them and leaving them free to turn farther downward as the action of the spring, $o$, throws the belt shifting rod in the direction of the arrow, T.

Having thus described our invention, we wish it to be understood that we do not limit its application to the particular form of slide upon the cam cylinder above mentioned, as the device may be modified in that respect without affecting the principle of operation, it being only necessary that there should be upon the cam cylinder parts adapted to engage with the tripping device, in certain positions of the latter, and so clear said device in another position thereof. Furthermore, we do not limit ourselves to the use of the exact driving mechanism, above described, for the sprocket wheel of the pattern chain, as the important feature of our invention in this behalf lies in the fact that said sprocket wheel is positively operated in a direct relation to the number of revolutions made by the cam cylinder, thereby enabling the apparatus to act as a course-counter and to effect two operations due to the presence of the pattern chain at positively predetermined intervals in the formation of rows of knitting loops.

We claim—

1. The combination, with the cam cylinder, its driving mechanism, and with the needle picking devices; of a tripping lever adapted in different positions to control the actuating mechanism for said devices or free the same; a longitudinally movable rod connected with said tripping lever; a pattern chain adapted to actuate said rod at intervals, and actuating mechanism for said pattern chain in positive engagement with said driving mechanism, whereby the needle picking devices may be thrown into or out of operation after the formation of a predetermined series of courses, substantially as set forth.

2. The combination, with the driving mechanism for the cam cylinder, of a belt shifting rod and shifting fingers; a rock shaft having an arm operatively connected with said belt shifting rod; a locking lever operatively connected with said rock shaft; a pattern chain lever connected with said locking lever; a pattern chain adapted at intervals to engage operatively with said last mentioned lever, and actuating mechanism for said pattern chain in operative engagement with the main driving mechanism, whereby the stop-motion can be operated after the formation of a predetermined series of knitting courses, substantially as set forth.

3. The combination, with the driving bevel gear shaft, of an eccentric mounted thereon; a lever, one end of which is in operative relation to said eccentric; a pawl mounted upon the other end of said lever; a ratchet wheel in operative relation to said pawl; a pattern chain driven by said ratchet wheel and provided with links, of three different heights, and with laterally projecting studs; a longitudinally movable rod in operative relation to said links; a tripping lever connected with said rod and adapted in different positions to control the actuating mechanism for the needle picking devices or free the same; a lever in operative relation to the pattern chain studs; a locking lever connected with said pattern chain lever; a belt shifting rod and shifting fingers; a rock shaft having an arm engaging with said locking lever and a second arm and link pivoted to said belt shifting rod, whereby said rod is locked in the normal position of said locking lever and freed by the action of said pattern chain studs upon their lever, substantially as set forth.

4. The combination with the cam cylinder, having needle picking devices provided with finger-pieces, substantially as set forth, of a movable slide carried by the cam cylinder and adapted to engage with said finger pieces; and automatic controlling mechanism, substantially as set forth, whereby said slide is shifted at predetermined intervals.

5. The combination with the cam cylinder, having needle picking devices provided with finger-pieces, substantially as set forth, of a movable slide carried by the cam cylinder and adapted to engage with said finger pieces substantially as set forth; a tripping device capable of being adjusted and set at different positions relatively to the plane of said slide and adapted to engage operatively with said slide or permit the passage thereof, substantially in the manner set forth, a pattern chain operatively connected with said tripping device, and actuating mechanism for said pattern chain, substantially as set forth.

6. The combination with the cam cylinder, having needle picking devices provided with finger-pieces, substantially as set forth, of a movable slide carried by the cam cylinder and adapted to engage with said finger pieces, substantially as set forth; a pair of oppositely inclined cam pieces mounted upon said slide with an interspace between their cam surfaces; a tripping lever adapted to operatively engage with said cam pieces or pass between the same, and mechanism substantially as set forth for automatically adjusting and setting said tripping lever in different vertical positions relatively to said cam pieces.

GRAHAM REID.
CHARLES STEVENSON.

Witnesses:
JAMES H. BELL,
E. REESE.